(12) United States Patent
Maruo et al.

(10) Patent No.: US 6,841,651 B2
(45) Date of Patent: Jan. 11, 2005

(54) POLYAMIDE RESIN

(75) Inventors: Kazunobu Maruo, Kanagawa (JP);
Tomomichi Kanda, Kanagawa (JP);
Koji Yamamoto, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/408,566

(22) Filed: Apr. 8, 2003

(65) Prior Publication Data

US 2003/0199667 A1 Oct. 23, 2003

(30) Foreign Application Priority Data

Apr. 19, 2002 (JP) ........................................ 2002-117446

(51) Int. Cl.$^7$ ........................ C08G 69/08; B32B 27/00; C08L 77/00
(52) U.S. Cl. ........................ 528/310; 528/170; 528/312; 528/313; 528/321; 528/322; 528/332; 528/335; 528/336; 528/337; 528/339; 524/414; 524/600; 524/602; 524/606; 524/710; 428/34.1; 428/36.9; 428/474.4
(58) Field of Search ................................ 528/310, 170, 528/322, 321, 337; 524/600, 602, 606, 414, 710

(56) References Cited

U.S. PATENT DOCUMENTS

| | | | | |
|---|---|---|---|---|
| 3,872,055 A | * | 3/1975 | Furukawa et al. | 524/112 |
| 6,166,171 A | * | 12/2000 | Yamamoto et al. | 528/310 |
| 6,191,251 B1 | * | 2/2001 | Pagilagan | 528/313 |
| 6,288,153 B1 | * | 9/2001 | Shimizu et al. | 524/397 |
| 6,303,741 B1 | * | 10/2001 | Tanaka | 528/332 |
| 6,384,181 B1 | * | 5/2002 | Nakano | 528/310 |
| 6,515,099 B2 | * | 2/2003 | Sato et al. | 528/310 |

FOREIGN PATENT DOCUMENTS

| | | |
|---|---|---|
| EP | 0 703 264 | 3/1996 |
| EP | 0 764 729 | 3/1997 |
| EP | 1 029 883 | 8/2000 |
| GB | 1 439 646 | 6/1976 |
| WO | WO 94/19394 | 9/1994 |

OTHER PUBLICATIONS

European International Search Report dated Jun. 4, 2003 for EP 03 00 7520 mailed with Communication dated Jun. 16, 2003.

* cited by examiner

Primary Examiner—P. Hampton Hightower
(74) Attorney, Agent, or Firm—Antonelli, Terry, Stout & Kraus, LLP

(57) ABSTRACT

The polyamide resin of the present invention is produced by polycondensation of a diamine component comprising 70 mol % or more of m-xylylenediamine and a dicarboxylic acid component comprising 70 mol % or more of a C4–C20 α, ω-straight-chain aliphatic dicarboxylic acid in the presence of at least one phosphorus compound selected from the group consisting of phosphinic acid compounds and phosphonous acid compounds and in the presence of an alkali metal compound of a weak acid. The weak acid has a dissociation constant lower than a first dissociation constant of a dicarboxylic acid mainly constituting the polyamide resin. The polyamide resin satisfies the following requirements (A), (B) and (C):

$14000 \leq a \leq 40000$      (A)

$b \leq 1.000$      (B)

$0.9930 \leq b - 1.1a^2 \times 10^{-11} + 3.2a \times 10^{-7} \leq 0.9980$      (C)

wherein a and b are as defined in the disclosure.

8 Claims, No Drawings

POLYAMIDE RESIN

BACKGROUND OF THE INVENTION

1. Field of the Invention

The present invention relates to a polyamide resin suitable for producing films, sheets, hollow molded articles such as bottles, and fibers. More specifically, the present invention relates to a polyamide resin produced by polycondensing a diamine component mainly comprising m-xylylenediamine and a dicarboxylic acid component mainly comprising adipic acid.

2. Description of the Prior Art

A polyamide produced by the polycondensation of a xylylenediamine and an aliphatic dicarboxylic acid, such as a polyamide produced from m-xylylenediamine and adipic acid (hereinafter may be referred to as "MX nylon"), has been used as a gas barrier material for films and bottles in the application fields of resin-reinforced injection materials and packaging materials, because of its high strength, high elastic modulus, low permeability to gaseous substance such as oxygen and carbon dioxide.

A polyamide resin has a terminal amino group and a terminal carboxyl group at its molecular chain ends. The terminal amino group and the terminal carboxylic group are subjected to amidation reaction to increase the molecular weight (increase in melt viscosity) when melted for producing shaped articles. The increase in the melt viscosity may result in a low flowing speed and a long-term retention of a molten resin in a molding machine. A resin thus heated for an excessively long period of time is subjected to not only further amidation but also cross-linking reaction to become three-dimensional, thereby likely to produce gelated mass that is different from a normal resin in their properties. In addition, the formation of gelated mass, etc. is accelerated if a molding machine has a portion stagnating a molten resin.

The formation of gelated mass may adversely affect the molding operation and the final products. Gelated mass formed on the inner wall of a flow path of molten resin in a molding machine causes uneven extrusion and uneven thickness of films and sheets. Gelated mass included in shaped articles creates defective portions such as fish eyes and hard spots to reduce the strength and spoil the appearance.

Therefore, to produce molded articles excellent in the strength and appearance by preventing the formation and inclusion of gelated mass, it is necessary to design a molding machine so as to minimize the stagnating portion, and additionally, it is inevitable to provide a high-quality polyamide which causes no abnormal reaction under melting.

One of the methods for preventing the amidation reaction under melting is to control the terminal amino concentration or the terminal carboxyl concentration of polyamide. "Kobunshi Ronbun-shu", Vol. 37, No. 2, pp95–102 describes that the viscosity increase and the gelation of polyamide MXD6 under melting are prevented by using a starting adipic acid or m-xylylenediamine as a viscosity stabilizer, and that such effects are increased with increasing amount of the viscosity stabilizer. However, a large amount of the viscosity stabilizer breaks the molar balance between the monomers participated in the reaction to prolong the reaction time and fail to obtain a polyamide having a molecular weight enough to produce molded articles having a sufficient strength.

Japanese Patent Application Laid-Open No. 49-38950 proposes to add a phosphorus compound or an alkali compound to improve the heat stability of polyamides. However, as a result of measurement of the gelation initiating time in a manner described in the example portion below, the mere addition of the proposed compound is not sufficiently effective. In addition, since the alkali compound slows down the rate of polycondensation, the proposed addition amount leads to a prolonged reaction time and a large heat history, thereby making it difficult to prevent the gel formation in a stagnating molten polyamide.

SUMMARY OF THE INVENTION

An object of the present invention is to proved a polyamide comprising a diamine component mainly comprising m-xylylenediamine and a dicarboxylic acid component mainly comprising a C4–C20 α, ω-straight-chain aliphatic dicarboxylic acid, which exhibits an excellent melt viscosity stability and is hard to form gels and fish eyes in a molding process into films, bottles, etc.

As a result of extensive study, the inventors have found that the above object is achieved by a polyamide resin that is produced by polycondensing a diamine component mainly comprising m-xylylenediamine and a dicarboxylic acid component mainly comprising a C4–C20 α, ω-straight-chain aliphatic dicarboxylic acid in the presence of specific additives so as to have a limited number average molecular weight and a limited terminal group molar ratio. The present invention has been accomplished on the basis of this finding.

Thus, the present invention relates to a polyamide resin produced by polycondensation of a diamine component comprising 70 mol % or more of m-xylylenediamine and a dicarboxylic acid component comprising 70 mol % or more of a C4–C20 α, ω-straight-chain aliphatic dicarboxylic acid, wherein the polycondensation is performed in the presence of at least one phosphorus compound selected from the group consisting of phosphinic acid compounds and phosphonous acid compounds in an amount of 3 to 400 ppm in terms of phosphorus atom based on a theoretical yield amount of the polyamide resin and in the presence of an alkali metal compound of a weak acid having a dissociation constant lower than a first dissociation constant of a dicarboxylic acid mainly constituting the polyamide resin in an amount of 0.5 to 1.0 mol per one mole of the phosphorus compound, and wherein the polyamide resin satisfies the following requirements (A), (B) and (C):

$$14000 \leq a \leq 40000 \quad \text{(A)}$$

$$b \leq 1.000 \quad \text{(B)}$$

$$0.9930 \leq b - 1.1a^2 \times 10^{-11} + 3.2a \times 10^{-7} \leq 0.9980 \quad \text{(C)}$$

wherein a is a number average molecular weight calculated from the following formula:

$$a = 2 \times 10^6 / ([COOH] + [NH_2])$$

wherein [COOH] is a terminal carboxyl concentration ($\mu$eq/g) and [NH$_2$] is a terminal amino concentration ($\mu$eq/g), b is a terminal group molar ratio represented by the following formula:

$$b = (1 - 18.015[NH_2] - \alpha([COOH] - [NH_2])) / (1 - 18.015[NH_2] + \beta([COOH] - [NH_2]))$$

wherein [COOH] and [NH$_2$] are as defined above, α is $\Sigma(Mna \times na)/2$ wherein Mna is a molecular weight of each dicarboxylic acid and na is a molar fraction of each carboxylic acid based on the total molar amount of the dicarboxylic acid component, and β is $\Sigma(Mnb \times nb)/2 - 18.015$ wherein Mnb is a molecular weight of each diamine and nb is a molar fraction of each diamine based on the total molar amount of the diamine component.

The present invention also relates to a shaped article comprising the polyamide resin.

The present invention further relates to a method for molding the polyamide, comprising a step of melt-molding the polyamide resin at a molten resin temperature of 275° C. or lower.

DETAILED DESCRIPTION OF THE INVENTION

The polyamide resin of the present invention is produced by the polycondensation of a diamine component comprising 70 mol % or more of m-xylylenediamine and a dicarboxylic acid component comprising 70 mol % or more of a C4–C20 α, ω-straight-chain aliphatic dicarboxylic acid.

The diamine component as a starting material for the polyamide resin comprises 70 mol % or more of m-xylylenediamine. The diamine component may contain 30 mol % of less of at least one diamine other than m-xylylenediamine, such as aliphatic diamines including tetramethylenediamine, pentamethylenediamine, hexamethylenediamine, octamethylenediamine and nonamethylenediamine; aromatic diamines including p-phenylenediamine, o-xylylenediamine and p-xylylenediamine; and alicyclic diamines including bis(aminomethyl)cyclohexane.

The dicarboxylic acid component as a starting material for the polyamide resin comprises 70 mol % or more of a C4–C20 α,ω-straight-chain aliphatic dicarboxylic acid such as succinic acid, glutaric acid, pimelic acid, suberic acid, azelaic acid, adipic acid, sebacic acid, undecanedioic acid and dodecanedioic, with adipic acid being preferred.

The dicarboxylic acid component may contain 30 mol % or less of a dicarboxylic acid other than the α,ω-straight-chain aliphatic dicarboxylic acid, such as an aromatic dicarboxylic acid including terephthalic acid, isophthalic acid and 2,6-naphthalenedicarboxylic acid.

The polyamide is produced in the presence of at least one phosphorus compound selected from the group consisting of phosphinic acid compounds and phosphonous acid compounds together with an alkali metal compound of a weak acid. The amount of the phosphorus compound is 3 to 400 ppm in terms of phosphorus atom based on a theoretical yield amount of the polyamide resin. The weak acid has a dissociation constant lower than a first dissociation constant of a dicarboxylic acid mainly constituting the polyamide resin. The alkali metal of such a weak acid is used 0.5 to 1.0 mol per one mole of the phosphorus compound. By performing the polycondensation in the presence of the phosphorus compound and the alkali metal compound of the weak acid in the limited amount and ratio and controlling the number average molecular weight and the terminal group molar ratio as mentioned below, a polyamide resin excellent in the melt viscosity stability in the molding into films, sheets and bottles with little formation of gels and fish eyes is obtained.

The phosphorus compound for use in the present invention is selected from the phosphinic acid compounds and the phosphonous acid compounds. Examples thereof include, but not limited to, hypophosphorous acid, sodium hypophosphite, potassium hypophosphite, lithium hypophosphite, ethyl hypophosphite, dimethylphosphinic acid, phenylmethylphosphinic acid, phenylphosphonous acid, sodium phenylphosphonite, potassium phenylphosphonite, and ethyl phenylphosphonite. Other phosphorus compounds such as phosphoric acid compounds, phosphorous acid compounds and phosphonic acid compounds are inferior to the phosphinic acid compounds and the phosphonous acid compounds in preventing the formation of gels.

By performing the polycondensation in the presence of the phosphorus compound in an amount of 3 to 400 ppm in terms of phosphorus atom based on the theoretical yield amount of polyamide, the gel formation associated with cross-linking reaction is prevented and the degradation or decomposition of the polyamide resin is also prevented because the reaction time can be reduced. In addition, the resultant polyamide resin is also hard to form gels due to cross-linking reaction in the molten state during the molding process because subjected to a low heat history. An addition amount of less than 3 ppm does not yield a sufficient effect for preventing the gel formation. An addition amount of exceeding 400 ppm brings about no additional improvement in preventing the gel formation.

The dissociation constant (Ka) is an indication of easiness of dissociation of acids or bases to ions. The larger the dissociation constant, the more easily dissociated acids or bases are. The inventors have found that the gel formation due to the amidation reaction and cross-linking reaction is influenced by the dissociation constant. Namely, by performing the polycondensation in the presence of an alkali metal compound of a weak acid that has a dissociation constant lower than a first dissociation constant of the major constitutional dicarboxylic acid of polyamide, a polyamide hardly forming gels due to the cross-linking reaction in either the production thereof and the molding thereof under molten state can be obtained.

Since the first dissociation constant varies depending on the types of the major constitutional dicarboxylic acid, the types of the weak acid usable in the present invention also varies depending on the types of the major constitutional dicarboxylic acid. For example, if the major constitutional dicarboxylic acid of polyamide is succinic acid, adipic acid or azelaic acid, usable as the weak acid are, but not limited to, carbonic acid, boric acid, acetic acid, propionic acid, butyric acid, isobutyric acid, crotonic acid, valeric acid, caproic acid, isocaproic acid, enanthic acid, caprylic, pelargonic, stearic, cyclopentanecarboxylic acid, cyclohexanecarboxylic acid, hydrocinnamic acid, γ-phenylbutyric acid, p-phenoxybenzoic acid, o-oxycinnamic acid, o-β-chlorophenylpropionic acid, and m-chlorophenylpropionic acid.

By adding the alkali metal compound of the weak acid in an amount of 0.5 to 1.0 mol per one mole of the phosphorus compound, the rate of reaction for forming amide linkages can be maintained at a practical level for industrial production, and the degradation and decomposition of the polyamide resin during the polycondensation can be prevented.

The polyamide resin of the present invention is regulated in its number average molecular weight and terminal group molar ratio so as to simultaneously satisfy the following requirements (A), (B) and (C):

$$14000 \leq a \leq 40000 \quad \text{(A)}$$

$$b \leq 1.000 \quad \text{(B)}$$

$$0.9930 \leq b - 1.1 a^2 \times 10^{-11} + 3.2 a \times 10^{-7} \leq 0.9980 \quad \text{(C)}$$

wherein a is the number average molecular weight calculated from the following formula:

$$a = 2 \times 10^6 / ([COOH] + [NH_2])$$

wherein [COOH] is a terminal carboxyl concentration ($\mu$eq/g) and [NH$_2$] is a terminal amino concentration ($\mu$eq/g), b is the terminal group molar ratio represented by the following formula:

$$b = (1 - 18.015[NH_2] - \alpha([COOH] - [NH_2]))/(1 - 18.015[NH_2] + \beta([COOH] - [NH_2]))$$

wherein [COOH] and [NH$_2$] are as defined above, $\beta$ is $\Sigma(Mna \times na)/2$ wherein Mna is a molecular weight of each dicarboxylic acid constituting the dicarboxylic acid component of the polyamide resin and na is a molar fraction of each carboxylic acid based on the total molar amount of the dicarboxylic acid component, and $\beta$ is $\Sigma(Mnb \times nb)/2 - 18.015$ wherein Mnb is a molecular weight of each diamine constituting the diamine component of the polyamide resin and nb is a molar fraction of each diamine based on the total molar amount of the diamine component.

In the present invention, the number average molecular weight of the polyamide resin should be regulated within a range from 14000 to 40000. By controlling the number average molecular weight to 14000 or less, the change of the melt viscosity and the uneven flow caused by extra reaction of forming amide linkages during the melt-molding process can be prevented to obtain molded articles with a sufficient mechanical strength. By controlling to 4000 or less, the resultant polyamide resin has a melt viscosity enough to permit easy molding.

In the polyamide resin of the present invention, the molar ratio of the terminal carboxyl group and the terminal amino group, i.e., the terminal group molar ratio represented by the following formula:

$$(1 - 18.015[NH_2] - \alpha([COOH] - [NH_2]))/(1 - 18.015[NH_2] + \beta([COOH] - [NH_2]))$$

wherein [COOH], [NH$_2$], $\alpha$ and $\beta$ are as defined above, is 1.000 or less, preferably 0.990 or more and the correlation between the terminal group molar ratio (b) and the number average molecular weight (a) satisfies the following formula:

$$0.9930 \leq b - 1.1 a^2 \times 10^{-11} + 3.2 a \times 10^{-7} \leq 0.9980.$$

By controlling the correlation to 0.9930 or more, the rate of reaction for forming amide linkages can be maintained at a practical level for industrial production, and also, the degradation and decomposition of the polyamide resin during the polycondensation can be prevented because the reaction time is reduced. When the terminal group molar ratio is 1.000 or less and the correlation of a and b is 0.9980 or less, the polymerization degree of the final polyamide resin can be effectively controlled because the rate of reaction for forming amide linkages can be prevented from being excessively large. In addition, the gel formation associated by the cross-linking reaction can be also prevented.

The polyamide resin having the above properties is produced by a melt polycondensation or a solid-phase polymerization in which a low viscosity polyamide produced by a melt polycondensation is then heat-treated in solid state.

The melt polycondensation is performed, for example, but not particularly limited to, by heating an aqueous solution of a nylon salt of m-xylylenediamine and adipic acid to allow the polycondensation to proceed while removing water added and water generated by the polycondensation, or alternatively, by directly adding m-xylylenediamine to molten adipic acid to proceed the polycondensation under ordinary pressure. The polymerization conditions are not particularly limited and one skilled in the art can determine without elaboration the optimum conditions for producing the polyamide resin having the above properties, particularly, the polyamide resin controlled in its number average molecular weight, terminal group molar ratio, etc., by suitably selecting the charging ratio of the starting dicarboxylic acid component and the diamine component, the polymerization catalyst, the polymerization temperature and the polymerization time.

If desired, the molecular weight of the polyamide resin can be increased preferably by the solid-phase polymerization. The solid-phase polymerization is performed, for example, but not specifically limited to, in a batch-wise heating apparatus under pressure or reduced pressure.

The polyamide resin of the present invention preferably satisfies the following requirement (D):

$$\ln(t) \geq 16133/(c + 273.15) - 25.581 \tag{D}$$

wherein c is a temperature (° C.) at which the polyamide resin is melted in a hermetically sealed container and t is a gelation initiating time (h).

The polyamide resin of the present invention may contain, if desired, an inorganic and/or organic compound such as lubricants, discoloration inhibitors, anti-crosslinking agents, light stabilizers, pigments, antistatic agents, flame retardants, mold releasing agents, phyllosilicates, organic or inorganic salts of Co, Mn or Zn, and complexes, solely and in combination of two or more.

The polyamide of the present invention is molded into shaped articles such as films, sheets and hollow containers by a known method. The polyamide resin shaped articles thus produced are excellent in the properties such as barrier properties against gaseous substances such as oxygen and carbon dioxide.

In particular, by molding the polyamide resin at a molten resin temperature of 275° C. or lower, the formation of gelated mass can be prevented, and simultaneously, the occurrence of defects such as gels and fish eyes in the shaped articles can be avoided.

The present invention will be described in more detail below with reference to the following examples. However, these examples are only illustrative and not intended to limit the scope of the invention thereto.

In the following examples and comparative examples, the measurements for evaluation were conducted in the following manners.

(1) Terminal Amino Concentration ([NH$_2$], $\mu$eq/g)

Accurately weighed 0.3 to 0.5 g of polyamide was dissolved into 30 ml of a phenol/ethanol mixed solution (4/1 by volume) at 20 to 30° C. under stirring. After the complete dissolution, the resulting solution was subjected to neutralization titration with a 1/100 N hydrochloric acid to determine the terminal amino concentration.

(2) Terminal Carboxyl Concentration ([COOH], $\mu$eq/g)

Accurately weighed 0.3 to 0.5 g of polyamide was dissolved under nitrogen gas flow into 30 ml of benzyl alcohol at 160 to 180° C. under stirring. After the complete dissolution, the resulting solution was cooled to 80° C. under nitrogen gas flow, added with 10 ml of methanol under stirring, and subjected to neutralization titration with a 1/100 N aqueous sodium hydroxide to determine the terminal amino concentration.

(3) Number Average Molecular Weight

Using the determined values of the terminal carboxyl concentration and the terminal amino concentration, calculated from the following formula (E):

$$\text{number average molecular weight} = 2 \times 10^6 / ([NH_2] + [COOH]) \quad (E).$$

(4) Formation of Gelated Film on Inner Wall of Flow Path during Continuous Extrusion Using a 40-mm extruder, polyamide resins melted at different temperatures were allowed to continuously pass at a rate of 3.5 kg/h for 24 h through a cylindrical flow path of 40 mm inner diameter and 200 mm length having its inner surface plated with hard chrome. The cylindrical flow path was maintained at the same temperature as used for melting each polyamide resin. After stopping the flowing, the cylindrical flow path was left stand for cooling to solidify the resin therein, and then, the solidified resin column was removed from the inner wall of the flow path. If discoloration was observed on the surface of the resin column, the thickness of the discolored portion at 100 mm downstream the flow entry was measured under a microscope.

(5) Gelation Initiating Time of Stagnated Molten Polyamide

Into a PTFE (polytetrafluoroethylene) cavity plate having a disk cavity of 36 mm inner diameter and 1 mm depth, 1.2 g of polyamide was charged. The plate was sealed by a PTFE cover without leaving air therein, and then heat-pressed for 30 s at 275° C. under 100 kg/cm² to prepare a polyamide disk plate. The polyamide plate was placed into a PTFE cavity plate having a cavity of the same dimension kept at respective temperature, pressed under 100 kg/cm² for respective period of time, and then quenched to room temperature, thereby obtaining each sample. Accurately weighed 100 mg of polyamide thus treated was dissolved in 20 ml of hexafluoroisopropanol (HFIP) at room temperature over 24 h. The solution was filtered through a PTFE membrane filter (pore size: 3 µm) having its weight already known, and the filter was washed with HFIP. The filter was dried for 30 min at 120° C. by a hot dryer and weighed to calculate the weight percentage of HFIP insolubles to the polyamide, which was employed as a gel concentration.

The above procedure was repeated by increasing the retention time in two-hour increments for each temperature, and the gelation initiating time was represented by the retention time at which the gel concentration exceeded 5% by weight.

EXAMPLE 1

Into a 0.05-m³ jacketed reaction vessel equipped with a stirring device, a partial condenser, a condenser, a thermometer, a dropping funnel and a nitrogen gas inlet, were charged accurately weighed 14.87 kg of adipic acid (first dissociation constant: $3.72 \times 10^{-5}$), 10.65 g of sodium hypophosphite and 8.58 g of sodium carbonate. The first dissociation constant of the weak acid (carbonic acid) was $4.45 \times 10^{-7}$, the addition amount of the phosphorus compound (sodium hypophosphite) was 150 ppm in terms of phosphorus atom based on the theoretical yield amount of polyamide, and the molar ratio of alkali metal compound to phosphorus compound was 0.7. After replacing the inner atmosphere thoroughly with nitrogen, adipic acid was dissolved by heating to 170° C. in a slight stream of nitrogen to make the contents into a uniform fluid, to which 13.77 g of m-xylylenediamine was added dropwise under stirring over 160 min while continuously raising the inner temperature to 245° C. and removing the water, that was distilled as m-xylylenediamine was added dropwise, from the reaction system through the partial condenser and the condenser.

After completing the dropwise addition of m-xylylenediamine, the inner temperature was continuously raised to 255° C. to continue the reaction for 15 min. Then, the inner pressure was continuously reduced to 600 mmHg over 10 min to further continue the reaction for 40 min while continuously raising the reaction temperature to 260° C.

After the reaction, the inside of the reaction vessel was pressurized by nitrogen gas to 0.2 MPa to extrude the polymer strand through a nozzle at the lower portion of the polymerization tank. The polymer strand was cooled and cut to obtain 25 kg of pellets. The above melt polymerization procedure was repeated 4 times in batch-wise manner to obtain 100 kg in total of pellets (Polyamide 1). Polyamide 1 had a melting point of 238° C., a number average molecular weight of 16000 and a terminal group molar ratio of 0.9940, satisfying the requirements (A), (B) and (C).

The gelation initiating time (t) of stagnated molten Polyamide 1 was 110 h at 260° C., 48 h at 275° C. and 22 h at 290° C., satisfying the requirement (D).

Polyamide 1 was passed through a cylindrical flow path at 270° C. to evaluate the gel formation on the inner wall of the flow path. No discoloration and no gel formation was noticed on the surface of the resin column.

COMPARATIVE EXAMPLE 1

In the same manner as in Example 1 except that the polycondensation was stopped 20 min after reducing the inner pressure of the reaction system to 600 mmHg, 100 kg pellets (Polyamide 2) were obtained. Polyamide 2 had a melting point of 237° C., a number average molecular weight of 13000 and a terminal group molar ratio of 0.9940, failing to satisfy the requirement (A).

The gelation initiating time (t) of stagnated molten Polyamide 2 was 102 h at 260° C., 40 h at 275° C. and 16 h at 290° C., failing to satisfy the formula (D).

Polyamide 2 was passed through a cylindrical flow path at 270° C. to evaluate the gel formation on the inner wall of the flow path. The surface of the resin column changed to brown color and the thickness of the brown portion was 100 µm.

EXAMPLE 2

Into a 0.05-m³ jacketed reaction vessel equipped with a stirring device, a partial condenser, a condenser, a thermometer, a dropping funnel and a nitrogen gas inlet, were charged accurately weighed 14.86 kg of adipic acid, 10.65 g of sodium hypophosphite and 8.58 g of sodium carbonate. The addition amount of the phosphorus compound (sodium hypophosphite) was 150 ppm in terms of phosphorus atom based on the theoretical yield amount of polyamide, and the molar ratio of alkali metal compound to phosphorus compound was 0.7. After replacing the inner atmosphere thoroughly with nitrogen, adipic acid was dissolved by heating to 170° C. in a slight stream of nitrogen to make the contents into a uniform fluid, to which 13.79 g of m-xylylenediamine was added dropwise under stirring over 160 min while continuously raising the inner temperature to 245° C. and removing the water, which was distilled as m-xylylenediamine was added dropwise, from the reaction system through the partial condenser and the condenser.

After completing the dropwise addition of m-xylylenediamine, the inner temperature was continuously raised to 255° C. to continue the reaction for 15 min. Then, the inner pressure was continuously reduced to 600 mmHg over 10 min to further continue the reaction for 40 min while continuously raising the reaction temperature to 260° C.

After the reaction, the inside of the reaction vessel was pressurized by nitrogen gas to 0.2 MPa to extrude the polymer strand through a nozzle at the lower portion of the polymerization tank. The polymer strand was cooled and cut to obtain 25 kg of pellets. The above melt polymerization procedure was repeated 4 times in batch-wise manner to obtain 100 kg in total of pellets.

Into a 0.25-m³ stainless heating apparatus of rotary drum type, 100 kg of the pellets were charged and the drum was rotated at 5 rpm. After replacing the inner atmosphere with nitrogen thoroughly, the temperature of the reaction system was raised from room temperature to 140° C. in a slight nitrogen flow. The reaction system was evacuated to 1 Torr when the temperature reached 140° C., and then, the temperature was raised to 200° C. over 110 min. After reaching 200° C., the reaction was further continued for 20 min at the same temperature.

After the reaction, the evacuation was stopped and the temperature was lowered in nitrogen flow. The pellets (Polyamide 3) were taken out when the temperature was lowered to 60° C.

Polyamide 3 had a melting point of 238° C., a number average molecular weight of 24000 and a terminal group molar ratio of 0.9955, satisfying the requirements (A), (B) and (C).

The gelation initiating time (t) of stagnated molten Polyamide 3 was 116 h at 260° C., 50 h at 275° C. and 22 h at 290° C., satisfying the requirement (D).

Polyamide 3 was passed through a cylindrical flow path at 270° C. to evaluate the gel formation on the inner wall of the flow path. No discoloration and no gel formation was noticed on the surface of the resin column.

EXAMPLE 3

The melt polymerization and the solid-phase polymerization were repeated in the same manner as in Example 2 except for using 6.66 g of sodium acetate in stead of sodium carbonate to obtain 100 kg of pellets (Polyamide 4). The dissociation constant of the weak acid (acetic acid) was $1.75 \times 10^{-5}$, the addition amount of the phosphorus compound (sodium hypophosphite) was 150 ppm in terms of phosphorus atom based on the theoretical yield amount of polyamide, and the molar ratio of alkali metal compound to phosphorus compound was 0.7. Polyamide 4 had a melting point of 238° C., a number average molecular weight of 24000 and a terminal group molar ratio of 0.9955, satisfying the requirements (A), (B) and (C).

The gelation initiating time (t) of stagnated molten Polyamide 4 was 117 h at 260° C., 52 h at 275° C. and 23 h at 290° C., satisfying the requirement (D).

Polyamide 4 was passed through a cylindrical flow path at 270° C. to evaluate the gel formation on the inner wall of the flow path. No discoloration and no gel formation was noticed on the surface of the resin column.

COMPARATIVE EXAMPLE 2

Polyamide 4 was passed through a cylindrical flow path at 290° C. to evaluate the gel formation on the inner wall of the flow path. The surface of the resin column changed to brown color and the thickness of the brown portion was 75 μm.

COMPARATIVE EXAMPLE 3

The melt polymerization and the solid-phase polymerization were repeated in the same manner as in Example 2 except for changing the addition amount of m-xylylenediamine to 13.81 kg and the solid-phase polymerization time at 200° C. to 10 min to obtain 100 kg of pellets (Polyamide 5). Polyamide 5 had a melting point of 238° C., a number average molecular weight of 23800 and a terminal group molar ratio of 0.9970, failing to satisfy the requirement (C).

The gelation initiating time (t) of stagnated molten Polyamide 5 was 104 h at 260° C., 42 h at 275° C. and 18 h at 290° C., failing to satisfy the formula (D).

Polyamide 5 was passed through a cylindrical flow path at 270° C. to evaluate the gel formation on the inner wall of the flow path. The surface of the resin column changed to brown color and the thickness of the brown portion was 90 μm.

EXAMPLE 4

The melt polymerization and the solid-phase polymerization were repeated in the same manner as in Example 2 except for changing the addition amount of m-xylylenediamine to 13.84 kg and the solid-phase polymerization time at 200° C. to 120 min to obtain 100 kg of pellets (Polyamide 6). Polyamide 6 had a melting point of 238° C., a number average molecular weight of 37000 and a terminal group molar ratio of 0.9990, satisfying the requirements (A), (B) and (C).

The gelation initiating time (t) of stagnated molten Polyamide 6 was 118 h at 260° C., 52 h at 275° C. and 24 h at 290° C., satisfying the requirement (D).

Polyamide 6 was passed through a cylindrical flow path at 270° C. to evaluate the gel formation on the inner wall of the flow path. No discoloration and no gel formation was noticed on the surface of the resin column.

COMPARATIVE EXAMPLE 4

Polyamide 6 was passed through a cylindrical flow path at 290° C. to evaluate the gel formation on the inner wall of the flow path. The surface of the resin column changed to brown color and the thickness of the brown portion was 75 μm.

COMPARATIVE EXAMPLE 5

The melt polymerization and the solid-phase polymerization were repeated in the same manner as in Example 4 except for changing the addition amount of m-xylylenediamine to 13.86 kg and the solid-phase polymerization time at 200° C. to 130 min to obtain 100 kg of pellets (Polyamide 7). Polyamide 7 had a melting point of 238° C., a number average molecular weight of 38400 and a terminal group molar ratio of 1.001, failing to satisfy the requirement (B).

The gelation initiating time (t) of stagnated molten Polyamide 7 was 104 h at 260° C., 42 h at 275° C. and 18 h at 290° C., failing to satisfy the formula (D).

Polyamide 7 was passed through a cylindrical flow path at 270° C. to evaluate the gel formation on the inner wall of the flow path. The surface of the resin column changed to brown color and the thickness of the brown portion was 80 μm.

COMPARATIVE EXAMPLE 6

The melt polymerization and the solid-phase polymerization were repeated in the same manner as in Example 4 except for changing the addition amount of m-xylylenediamine to 13.85 kg and the solid-phase polymerization time at 200° C. to 160 min to obtain 100 kg of pellets (Polyamide 8). Polyamide 8 had a melting point of 239° C., a number average molecular weight of 42000 and a terminal group molar ratio of 0.9995, failing to satisfy the requirement (A).

The gelation initiating time (t) of stagnated molten Polyamide 8 was 100 h at 260° C., 41 h at 275° C. and 17 h at 290° C., failing to satisfy the formula (D).

Polyamide 8 was passed through a cylindrical flow path at 270° C. to evaluate the gel formation on the inner wall of the flow path. The surface of the resin column changed to brown color and the thickness of the brown portion was 90 μm.

COMPARATIVE EXAMPLE 7

The melt polymerization and the solid-phase polymerization were repeated in the same manner as in Example 4 except for changing the addition amount of m-xylylenediamine to 13.72 kg, the melt polymerization time after reducing to 600 mmHg to 60 min, and the solid-phase polymerization time at 200° C. to 180 min to obtain 100 kg of pellets (Polyamide 9). Polyamide 9 had a melting point of 238° C., a number average molecular weight of 23000 and a terminal group molar ratio of 0.9900, failing to satisfy the requirement (C).

The gelation initiating time (t) of stagnated molten Polyamide 9 was 101 h at 260° C., 42 h at 275° C. and 18 h at 290° C., failing to satisfy the formula (D).

Polyamide 9 was passed through a cylindrical flow path at 270° C. to evaluate the gel formation on the inner wall of the flow path. The surface of the resin column changed to brown color and the thickness of the brown portion was 70 μm.

COMPARATIVE EXAMPLE 8

The melt polymerization and the solid-phase polymerization were repeated in the same manner as in Example 2 except for using 14.53 g of sodium dihydrogen phosphate in stead of sodium hypophosphite to obtain 100 kg of pellets (Polyamide 10). The addition amount of the phosphorus compound (sodium dihydrogen phosphate) was 150 ppm in terms of phosphorus atom based on the theoretical yield amount of polyamide, and the molar ratio of alkali metal compound to phosphorus compound was 0.7. Polyamide 10 had a melting point of 238° C., a number average molecular weight of 24000 and a terminal group molar ratio of 0.9955, satisfying the requirements (A), (B) and (C).

The gelation initiating time (t) of stagnated molten Polyamide 10 was 99 h at 260° C., 40 h at 275° C. and 16 h at 290° C., failing to satisfy the formula (D).

Polyamide 10 was passed through a cylindrical flow path at 270° C. to evaluate the gel formation on the inner wall of the flow path. The surface of the resin column changed to brown color and the thickness of the brown portion was 90 μm.

COMPARATIVE EXAMPLE 9

The melt polymerization and the solid-phase polymerization were repeated in the same manner as in Example 2 except for using 11.69 g of sodium benzoate in stead of sodium carbonate to obtain 100 kg of pellets (Polyamide 11). The dissociation constant of the weak acid (benzoic acid) was $6.31 \times 10^{-5}$, and the molar ratio of alkali metal compound to phosphorus compound was 0.7. Polyamide 11 had a melting point of 238° C., a number average molecular weight of 23000 and a terminal group molar ratio of 0.9955, satisfying the requirements (A), (B) and (C).

The gelation initiating time (t) of stagnated molten Polyamide 11 was 100 h at 260° C., 41 h at 275° C. and 16 h at 290° C., failing to satisfy the formula (D).

Polyamide 11 was passed through a cylindrical flow path at 270° C. to evaluate the gel formation on the inner wall of the flow path. The surface of the resin column changed to brown color and the thickness of the brown portion was 90 μm.

COMPARATIVE EXAMPLE 10

The melt polymerization and the solid-phase polymerization were repeated in the same manner as in Example 2 except for using 3.24 g of sodium hydroxide in stead of sodium carbonate to obtain 100 kg of pellets (Polyamide 12). The molar ratio of alkali metal compound to phosphorus compound was 0.7. Polyamide 12 had a melting point of 238° C., a number average molecular weight of 23000 and a terminal group molar ratio of 0.9955, satisfying the requirements (A), (B) and (C).

The gelation initiating time (t) of stagnated molten Polyamide 12 was 102 h at 260° C., 42 h at 275° C. and 18 h at 290° C., failing to satisfy the formula (D).

Polyamide 12 was passed through a cylindrical flow path at 270° C. to evaluate the gel formation on the inner wall of the flow path. The surface of the resin column changed to brown color and the thickness of the brown portion was 70 μm.

COMPARATIVE EXAMPLE 11

The melt polymerization and the solid-phase polymerization were repeated in the same manner as in Example 2 except for using 14.91 g of sodium acetate in stead of sodium carbonate and changing the solid-phase polymerization time at 200° C. to 180 min to obtain 100 kg of pellets (Polyamide 13). The molar ratio of alkali metal compound to phosphorus compound was 1.5. Polyamide 13 had a melting point of 238° C., a number average molecular weight of 22000 and a terminal group molar ratio of 0.9955, satisfying the requirements (A), (B) and (C).

The gelation initiating time (t) of stagnated molten Polyamide 13 was 104 h at 260° C., 43 h at 275° C. and 19 h at 290° C., failing to satisfy the formula (D).

Polyamide 13 was passed through a cylindrical flow path at 270° C. to evaluate the gel formation on the inner wall of the flow path. The surface of the resin column changed to brown color and the thickness of the brown portion was 40 μm.

COMPARATIVE EXAMPLE 12

The melt polymerization and the solid-phase polymerization were repeated in the same manner as in Example 2 except for using 2.98 g of sodium acetate in stead of sodium carbonate to obtain 100 kg of pellets (Polyamide 14). The molar ratio of alkali metal compound to phosphorus compound was 0.3. Polyamide 14 had a melting point of 238° C., a number average molecular weight of 25000 and a terminal group molar ratio of 0.9955, satisfying the requirements (A), (B) and (C).

The gelation initiating time (t) of stagnated molten Polyamide 14 was 100 h at 260° C., 41 h at 275° C. and 17 h at 290° C., failing to satisfy the formula (D).

Polyamide 14 was passed through a cylindrical flow path at 270° C. to evaluate the gel formation on the inner wall of the flow path. The surface of the resin column changed to brown color and the thickness of the brown portion was 90 μm.

COMPARATIVE EXAMPLE 13

The melt polymerization and the solid-phase polymerization were repeated in the same manner as in Example 2 except for using no sodium hypophosphite and changing the solid-phase polymerization time at 200° C. to 180 min to obtain 100 kg of pellets (Polyamide 15). Polyamide 15 had a melting point of 238° C., a number average molecular weight of 23000 and a terminal group molar ratio of 0.9955, satisfying the requirements (A), (B) and (C).

The gelation initiating time (t) of stagnated molten Polyamide 15 was 105 h at 260° C., 45 h at 275° C. and 20 h at 290° C., failing to satisfy the formula (D).

Polyamide 15 was passed through a cylindrical flow path at 270° C. to evaluate the gel formation on the inner wall of the flow path. The surface of the resin column changed to brown color and the thickness of the brown portion was 40 µm.

COMPARATIVE EXAMPLE 14

The melt polymerization and the solid-phase polymerization were repeated in the same manner as in Example 2 except for using no sodium hypophosphite to obtain 100 kg of pellets (Polyamide 16). Polyamide 16 had a melting point of 238° C., a number average molecular weight of 24000 and a terminal group molar ratio of 0.9955, satisfying the requirements (A), (B) and (C).

The gelation initiating time (t) of stagnated molten Polyamide 16 was 100 h at 260° C., 40 h at 275° C. and 17 h at 290° C., failing to satisfy the formula (D).

Polyamide 16 was passed through a cylindrical flow path at 270° C. to evaluate the gel formation on the inner wall of the flow path. The surface of the resin column changed to brown color and the thickness of the brown portion was 100 µm.

The polyamide of the present invention is industrially useful material because of its excellent melt viscosity stability in the molding process into films, sheets or bottles and its preventing effect against the formation of gels and fish eyes.

What is claimed is:

1. A polyamide resin produced by polycondensation of a diamine component comprising 70 mol % or more of m-xylylenediamine and a dicarboxylic acid component comprising 70 mol % or more of a C4–C20 $\alpha$, $\omega$-straight-chain aliphatic dicarboxylic acid, wherein the polycondensation is performed in the presence of at least one phosphorus compound selected from the group consisting of phosphinic acid compounds and phosphonous acid compounds in an amount of 3 to 400 ppm in terms of phosphorus atom based on a theoretical yield amount of the polyamide resin and in the presence of an alkali metal compound of a weak acid having a dissociation constant lower than a first dissociation constant of a dicarboxylic acid mainly constituting the polyamide resin in an amount of 0.5 to 1.0 mol per one mole of the phosphorus compound, and wherein the polyamide resin satisfies the following requirements (A), (B) and (C):

$14000 \leq a \leq 40000$ (A)

$b \leq 1.000$ (B)

$0.9930 < b - 1.1a^2 \times 10^{-11} + 3.2a \times 10^{-7} \leq 0.9980$ (C)

wherein a is a number average molecular weight calculated from the following formula:

$$a = 2 \times 10^6 / ([COOH] + [NH_2])$$

wherein [COOH] is a terminal carboxyl concentration (µeq/g) and [NH$_2$] is a terminal amino concentration (µeq/g), b is a terminal group molar ratio represented by the following formula:

$$b = (1 - 18.015[NH_2] - \alpha([COOH] - [NH_2]))/(1 - 18.015[NH_2] + \beta([COOH] - [NH_2]))$$

wherein [COOH] and [NH$_2$] are as defined above, $\alpha$ is $\Sigma(Mna \times na)/2$ wherein Mna is a molecular weight of each dicarboxylic acid and na is a molar fraction of each carboxylic acid based on the total molar amount of the dicarboxylic acid component, and $\beta$ is $\Sigma(Mnb \times nb)/2 - 18.015$ wherein Mnb is a molecular weight of each diamine and nb is a molar fraction of each diamine based on the total molar amount of the diamine component.

2. The polyamide resin according to claim 1, further satisfying the following requirement (D):

$\ln(t) \geq 16133/(c+273.15) - 25.581$ (D)

wherein c is a temperature (° C.) at which the polyamide resin is melted in a hermetically sealed container and t is a gelation initiating time (h).

3. The polyamide resin according to claim 1, wherein the C4–C20 $\alpha$, $\omega$-straight-chain aliphatic dicarboxylic acid is at least one dicarboxylic acid selected from the group consisting of succinic acid, glutaric acid, pimelic acid, suberic acid, azelaic acid, adipic acid, sebacic acid, undecanedioic acid and dodecanedioic.

4. The polyamide resin according to claim 1, wherein the C4–C20 $\alpha$, $\omega$-straight-chain aliphatic dicarboxylic acid is at least one dicarboxylic acid selected from the group consisting of succinic acid, azelaic acid, and adipic acid.

5. The polyamide resin according to claim 4, wherein the weak acid is at least one acid selected from the group consisting of carbonic acid, boric acid, acetic acid, propionic acid, butyric acid, isobutyric acid, crotonic acid, valeric acid, caproic acid, isocaproic acid, enanthic acid, caprylic, pelargonic, stearic, cyclopentanecarboxylic acid, cyclohexanecarboxylic acid, hydrocinnamic acid, $\gamma$-phenylbutyric acid, p-phenoxybenzoic acid, o-oxycinnamic acid, o-$\beta$-chlorophenylpropionic acid, and m-chlorophenylpropionic acid.

6. The polyamide resin according to claim 1, wherein the phosphorus compound is at least one compound selected from the group consisting of hypophosphorous acid, sodium hypophosphite, potassium hypophosphite, lithium hypophosphite, ethyl hypophosphite, dimethylphosphinic acid, phenylmethylphosphinic acid, phenylphosphonous acid, sodium phenylphosphonite, potassium phenylphosphonite, and ethyl phenylphosphonite.

7. A shaped article produced by molding a polyamide resin as defined in claim 1.

8. A method for molding a polyamide resin as defined in claim 1, which comprises a step of melt-molding the polyamide resin at a molten resin temperature of 275° C. or lower.

* * * * *